W. D. McKINNEY.
TRIPOD.
APPLICATION FILED APR. 30, 1918.
1,324,605.
Patented Dec. 9, 1919.
2 SHEETS—SHEET 1.
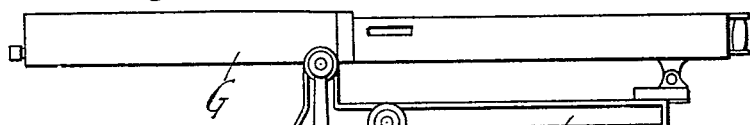
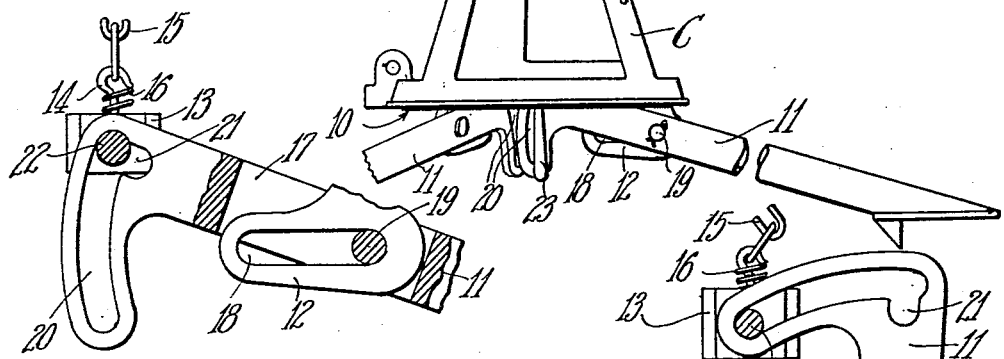
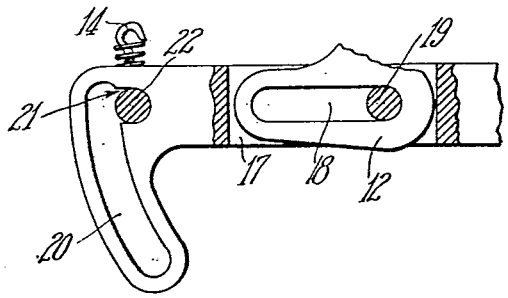
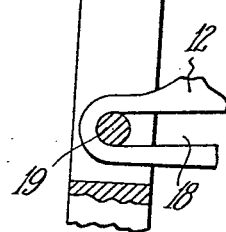
INVENTOR.
William D. McKinney.
BY Harold E. Hartwell
ATTORNEY.

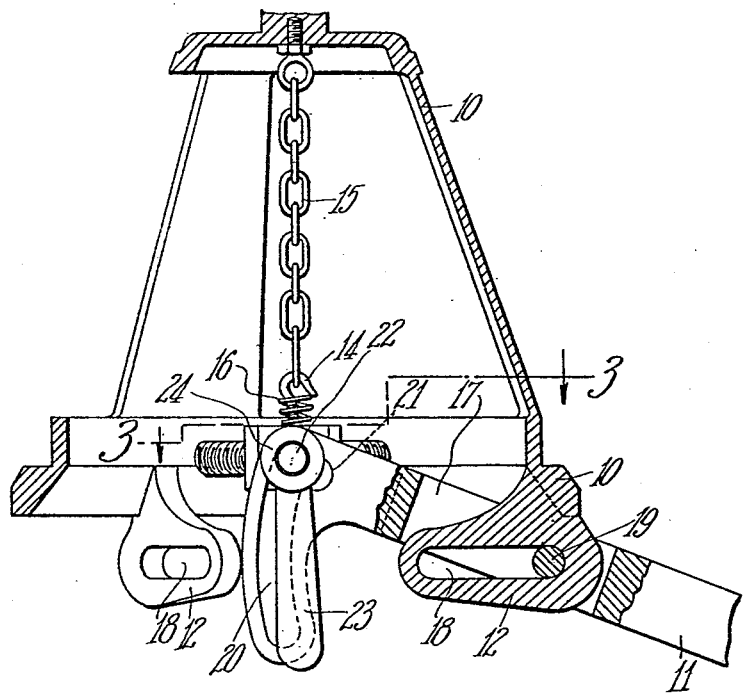
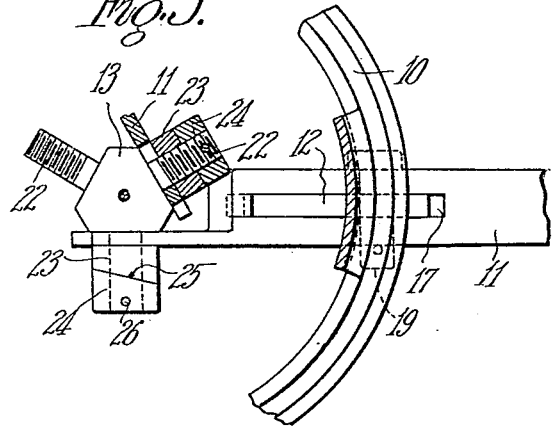

UNITED STATES PATENT OFFICE.

WILLIAM DONALD McKINNEY, OF LOS ANGELES, CALIFORNIA, ASSIGNOR OF FORTY-FIVE ONE-HUNDREDTHS TO FOREST R. GEE AND FIFTY-FIVE ONE-HUNDREDTHS TO JAMES T. ROBINSON, BOTH OF HOLYOKE, MASSACHUSETTS.

TRIPOD.

1,324,605.  Specification of Letters Patent.  Patented Dec. 9, 1919.

Application filed April 30, 1918. Serial No. 231,592.

*To all whom it may concern:*

Be it known that I, WILLIAM DONALD McKINNEY, a citizen of the United States, residing at Los Angeles, in the county of Los Angeles and State of California, but temporarily residing at Holyoke, in the county of Hampden and State of Massachusetts, have invented certain new and useful Improvements in Tripods, of which the following is a specification.

This invention relates generally to improvements in tripods, and more particularly to tripods which are adapted for use in supporting small arms, such as machine guns and the like for example. The invention, although capable of general application, finds one advantageous use as a means for supporting gun mounts of the type disclosed in my copending application Serial No. 221,488, filed March 9, 1918.

An object of the invention is to provide in a tripod, improved connections between the several legs and the base member to the end that the legs, when adjusted for a given spread or inclination relatively to the base member, may automatically move upwardly to a less spread when the base member is lifted to carry the legs free from the ground, whereby when the base member is again lowered the weight applied to the legs causes them to be simultaneously thrust radially outward to dig into the ground as they assume their desired spread-out position.

Another object of the invention is to provide in a tripod an improved mounting of the tripod legs on the base member, such that each leg has a two-point support from the latter and is also adjustable to various inclinations relatively to the base member.

Another object of the invention is to provide in a tripod of the class described, an improved mounting of the tripod legs on the base member arranged so that the legs may be simultaneously adjusted throughout a wide range from a substantially horizontal to a substantially vertical position and so that each leg may be adjusted independently of the others when desired.

A further object of the invention is to provide in a tripod, generally improved mechanical structure.

Other objects and advantages will appear in the following description and in the appended claims.

The invention, in an embodiment at present preferred, is disclosed for illustrative purposes in the accompanying drawings, in which:

Figure 1 is an elevational view of a tripod embodying the invention, the tripod being shown as supporting a machine gun and its mount;

Fig. 2 is an enlarged sectional elevation of the tripod, with certain parts broken away;

Fig. 3 is a fragmentary sectional plan view thereof taken on the line 3—3 of Fig. 2;

Fig. 4 is an enlarged fragmentary view showing a tripod leg in one position relatively to the base member;

Figs. 5 and 6 are views taken similarly to Fig. 4 showing the parts in different relative positions.

Referring to these drawings in detail, the tripod consists of a suitable base member 10 which is adapted to be supported from the ground by a plurality of legs 11. The base member 10 is preferably hollow and of generally frusto-conical form, as illustrated. The member 10 may be used to support any desired device or instrument, as, for example, a machine gun G which may be supported, as indicated in Fig. 1, on a saddle S adjustable in a vertical plane, and the saddle S may be supported on a revoluble cone C adjustable in a horizontal plane relatively to the base member. The specific mounting of the machine gun forms no part of the present invention and is disclosed and claimed in the above-named application, to which reference is made for a more complete disclosure.

The invention is particularly concerned with the manner of connecting the tripod legs 11 to the base member 10. As the mounting of each of the three legs 11 is similar, a description of one will suffice for all. Referring to Fig. 2, it will be seen that the leg 11 has a two-point engagement with the member 10, one directly through a lug 12 formed integrally with member 10 and extending radially inwardly therefrom, and the other indirectly through a block 13. The latter, of slightly modified triangular cross-section, has adjustably secured in its upper face a hook 14 for engagement with one end of a chain 15, or like flexible member. The other end of chain 15 is secured, preferably adjustably as shown, to the under face of the top portion of the hollow frusto-conical member 10. Preferably, a spring 16 is loosely coiled around hook 14 to prevent dislodgment of the chain therefrom. The block 13 thus forms indirectly a part of the base member and a part which can yield upwardly but not downwardly in a vertical direction. The block 13 is also detachable conveniently by disengaging the chain 15 from hook 14 after spring 16 has been compressed.

As shown in Figs. 3 and 4, the leg 11 has a slot 17 therein to receive the lug 12 which closely fits the slot and thereby prevents relative lateral movement of the leg and base member 10. The lug 12 is provided with an elongated horizontal slot 18, and the leg and lug are held together by a pin 19 which rides in slot 18. The upper or inner end of a leg 11 is provided with an elongated arcuate slot 20, the curvature of which is concentric with the pin 19. Near the upper end of slot 20 is a short slot or recess 21, the center line of which is directed substantially radially with respect to pin 19. In the specific embodiment illustrated, the center line of slot 21 is coincidental with the center line of the leg 11.

The block 13 as shown is substantially a triangular prism with its principal vertical faces arranged at an angle of 120 degrees to each other. On each of such faces and extending outwardly therefrom in rightangular relation, is a stud 22, the outer end of which is screw-threaded. The stud 22 passes through the slot 20 of leg 11, or, when desired, may be positioned in slot 21, as will appear. A handle 23 is loosely mounted on stud 22 with one face in engagement with the outer face of leg 11. A nut 24 is threaded on the outer end of stud 22 and is therefore adjustable toward and away from handle 23, as desired. The adjacent faces of handle 23 and nut 24 are formed with coacting cam surfaces 25, to the end that a swinging movement of handle 23 in the appropriate direction will, by engagement with nut 24, cause the handle and thus the leg 11 to be thrust tightly against the block 13, whereby the leg may be clamped in various positions, as will appear. The nut 24, once adjusted on stud 22, is preferably pinned, as at 26, or otherwise fixedly connected thereto, whereby the adjustment once made may be retained.

The tripod legs may be arranged in various positions relatively to the base member 10, the principal ones being termed the normal position, squat position, and folded position. The normal position of the tripod legs is best shown in Fig. 4, and as there shown, the pin 19 lies in the outer end of slot 18 and the stud 22 in the upper end of slot 20. The weight of member 10 and the devices carried thereby acts vertically upon the three legs 11, through lugs 12 and pins 19, and, since the outer ends of the legs are in engagement with the ground, this weight tends to swing the legs downwardly with their outer and ground-engaging ends as fulcra. Thus, the upper ends of the legs 11 are thrust downwardly until the studs 22 engage the upper walls of slots 20. The chain 15 is of such length that it is taut when the parts are in the positions shown in Fig. 4, whereby each leg exerts a downward pull on chain 15 and thus on the top of the base member 10. Due to the several legs all acting equally and simultaneously in the described manner, the block 13 is maintained in a central position with relation to the base member. Now, since the legs pull downwardly on the block 13 and the axes of the legs are inclined relatively to the vertical axis of the block, there is a component of force which acts to thrust the legs 11 radially outwardly until the pins 19 abut the ends of the slots 18. When the tripod legs are positioned, as shown in Fig. 4, it is not essential that they be clamped by the handle 23, for the legs are held from lateral displacement by the engagement of lugs 12 in slots 17. The tripod legs effectively support the base member 10 and brace the latter against displacement in all directions except vertically upward, which is generally not required. Obviously, the clamping of the legs to block 13 may be utilized to prevent upward vertical displacement, if desired, but ordinarily such clamping is not required nor desired, for a certain freedom of movement vertically upward is desired to permit an important advantage to be later described.

With the tripod legs in normal position, it will be obvious that they can assume only one definite inclination relatively to the base member. However, the inclination of the lugs when in normal position may be made anything desired, and that chosen and shown in the drawings is the inclination most generally favored for the contemplated use of the invention in gun mounts. In certain instances, where it is desired to bring the base member 10 in closer relation to the ground, the legs may be moved to their "squat" position. In such position, the legs all lie in substantially a horizontal plane, as shown in Fig. 5. To move the legs into such position, the chain 15 must be disconnected from hook 14 to permit the block 13 to be lowered relatively to the base member 10. Then, as the legs are swung toward the horizontal position illustrated, their inner ends, acting upon the studs 22, force down the block 13, and, as the latter is lowered, the studs 22 ride into the slots 21. As the legs reach substantially a horizontal position, the pins 19 abut with the outer end walls of slots 18 and the studs 22 with the end walls of slots 21. By making the distance between the center of pin 19 and the end of slot 21 just a trifle greater than the distance between the vertical center line of base member 10 and the right-hand end of slot 18, the legs 11 are prevented from exactly reaching the horizontal position. However, they approach this position very closely and are purposely restrained from quite reaching it, to prevent the legs from "crossing centers" and thereby assuming upwardly-inclined positions not desired. It is to be noted that clamping of the legs is also not essential for holding them in squat position, although the clamps may be used if desired.

When the tripod is to be carried, the legs 11 may be moved into folded position for convenient portabilty. With the parts positioned as in Fig. 4, it will be seen that each leg 11 may be swung toward the vertical with pin 19 as a center until the lower end of slot 20 abuts stud 22. Then each leg may be forced inwardly until the pin 19 lies in the inner end of slot 18. This latter movement will necessarily raise block 13, the chain 15 permitting such movement and the spring 16 preventing disengagement of the chain and hook 14 during such movement. The parts are thus movable into the positions shown in Fig. 6, wherein the legs are substantially vertical. As a matter of fact, the legs are movable slightly beyond the exact vertical position, so that they converge downwardly, the arrangement being such that the lower ends of the legs may be drawn into abutment. The legs when thus positioned may be clamped by handles 23.

The adjustments described are used when it is desired that the legs shall assume equal inclinations relatively to the base member. The construction illustrated, however, also permits individual adjustment of each leg. Thus, with the parts positioned as in Fig. 4, any one or more of the legs may be moved through the angle prescribed by the confines of slot 20 and may be held in its various positions of adjustment by actuating the clamping handles 23.

Aside from the features of adjustability, the construction disclosed has another and important feature. In setting up the tripod, it is desired, as is well known, that all the legs should be firmly embedded in the ground. Ordinarily, the operator separately forces each leg into the ground, which is more or less of a tedious and laborious operation and one which at best is time consuming. The present structure is characterized by an arrangement whereby the several legs may automatically and simultaneously dig into the ground. Assume that the base member 10 is lifted to bring the lower ends of all the legs away from the ground. Now the handles 23 and nuts 24, even when not in clamping position, present some frictional resistance to the movement of the legs and the block 13 is yieldable vertically. Therefore, when the base member 10 is lifted, the outer portions of the legs overbalance the inner portions and the pins 19 are carried inwardly in the slots 18 to a certain extent. At the same time, the block 13 raises slightly. Now, when the base member is lowered toward the ground, the legs, as described, are not fully spread out and their ground-engaging ends strike the ground at points closer to the center of the tripod than the points in which the legs finally come to rest. As soon as the legs engage the ground, the weight of the base member, or pressure applied thereto if necessary, causes the legs to move into their final spread-out position, with the result that each leg is simultaneously thrust radially outward to dig into the soil.

An important feature of the invention consists in the provision of a two-point support for each tripod leg. With such arrangement, clamping of the legs need not be generally relied upon to hold the legs in the desired position, as has already been pointed out. It is recognized that a two-point support for a tripod leg has been provided heretofore, but the present invention is characterized by providing a two-point support and permitting adjustment of the legs while still retaining the benefits of the two-point support.

The invention has been disclosed in an embodiment at present preferred to comply with the patent statutes, but the scope of the invention is to be defined by the appended claims rather than by the foregoing description.

What I claim is—

1. A tripod, comprising in combination, a suitable base member, a plurality of legs to support the latter from the ground, and means connecting each leg to the base member so that pressure imposed through the latter on the legs causes each to be simultaneously thrust radially outward relatively to the member, whereby the outer ends of the legs may dig into the ground.

2. A tripod, comprising in combination, a suitable base member, a plurality of legs to support the latter from the ground, and means connecting the legs to said member so that the legs may assume a definite position with relation to said member, said means arranged so that the legs move to another position of less spread when not subjected to pressure, whereby when pressure is applied to the legs, they are simultaneously thrust radially outwardly to dig into the ground as they assume their desired position of spread.

3. A tripod, comprising, an annular base member, a central support suspended from the latter, and a plurality of legs each having a pin and slot connection with said member and with said support.

4. In a tripod, a substantially circular base member, a central support connected to the latter for limited vertical movement, and a plurality of legs each having a pivotal connection with said support and a pin and slot connection with said member.

5. In a tripod, a substantially circular base member, a central support connected to the latter for limited vertical movement, and a plurality of legs each having a pivotal connection with said member and a pin and slot connection with said support.

6. In a tripod, a base member having a rim portion, a support connected to said member and disposed centrally in said portion, and a plurality of legs each having a pin and slot connection with said rim portion and said support, said connections permitting movement of the legs from a position substantially parallel to said portion to a position substantially normal thereto.

7. In a tripod, a base member having a rim portion provided with a plurality of lugs, a plurality of legs slotted intermediate their ends to receive said lugs, means pivotally connecting said legs and lugs, a central support within said portion, arcuate slots formed in the inner ends of said legs, and pins on said support to ride in said slots.

8. In a tripod, a base member having a rim portion provided with a plurality of lugs, a plurality of legs slotted intermediate their ends to receive said lugs, means pivotally connecting said legs and lugs, a central support within said portion, arcuate slots formed in the inner ends of said legs, pins on said support to ride in said slots, and means to clamp each leg to said support.

9. In a tripod, a base member having a rim portion provided with a plurality of lugs, a plurality of legs slotted intermediate their ends to receive said lugs, means pivotally connecting said legs and lugs, a central support within said portion, arcuate slots formed in the inner ends of said legs and concentric with said pivotal connecting means, slots intersecting said arcuate slots and disposed radially with respect to the last-named means, pins on the support to ride in said slots, and means to clamp each leg to said support.

10. In a tripod, a base member having a rim portion provided with a plurality of lugs, a plurality of legs slotted intermediate their ends to receive said lugs, an elongated slot in each lug disposed at right angles to the axis of said portion, pins in the legs to ride in said slots, a central support within said portion, arcuate slots formed in the inner ends of said legs, and pins on said support to ride in said arcuate slots.

WILLIAM DONALD McKINNEY.